(12) United States Patent
Oswald et al.

(10) Patent No.: US 10,940,510 B2
(45) Date of Patent: Mar. 9, 2021

(54) ADDITIVE MANUFACTURED CONGLOMERATED POWDER REMOVAL FROM INTERNAL PASSAGES WITH CO-BUILT ULTRASONIC HORNS

(71) Applicant: UNITED TECHNOLOGIES CORPORATION, Hartford, CT (US)

(72) Inventors: Caitlin Oswald, Ellington, CT (US); Jesse R Boyer, Middletown, CT (US); John P Rizzo, Jr., Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1070 days.

(21) Appl. No.: 15/011,969

(22) Filed: Feb. 1, 2016

(65) Prior Publication Data

US 2017/0217094 A1  Aug. 3, 2017

(51) Int. Cl.
| | |
|---|---|
| *B29L 31/00* | (2006.01) |
| *B08B 9/00* | (2006.01) |
| *B22F 3/105* | (2006.01) |
| *B22F 3/24* | (2006.01) |
| *B29C 64/35* | (2017.01) |
| *B29C 64/153* | (2017.01) |
| *B33Y 40/00* | (2020.01) |

(Continued)

(52) U.S. Cl.
CPC .............. *B08B 9/00* (2013.01); *B22F 3/1055* (2013.01); *B22F 3/24* (2013.01); *B29C 64/153* (2017.08); *B29C 64/35* (2017.08); *B33Y 40/00* (2014.12); *B08B 2209/005* (2013.01); *B22F 2003/1059* (2013.01); *B22F 2003/247* (2013.01); *B29L 2031/00* (2013.01); *B33Y 10/00* (2014.12); *B33Y 30/00* (2014.12); *Y02P 10/25* (2015.11)

(58) Field of Classification Search
CPC ... B29C 67/0077; B29C 64/35; B29C 64/153; B33Y 30/00; B33Y 10/00; B29L 2031/00; B08B 9/00; B08B 2209/005; B22F 3/1055; B22F 3/24; B22F 2003/1059; B22F 2003/247; Y02P 10/25
See application file for complete search history.

(56) References Cited

U.S. PATENT DOCUMENTS

| | | |
|---|---|---|
| 5,595,243 A | 1/1997 | Maki, Jr. |
| 6,995,334 B1 | 2/2006 | Kovacevic et al. |

(Continued)

FOREIGN PATENT DOCUMENTS

| | | |
|---|---|---|
| EP | 3069805 A2 | 9/2016 |
| EP | 0369805 A3 | 10/2016 |

(Continued)

OTHER PUBLICATIONS

EP Search Report dated Jun. 8, 2017 issued in corresponding EP Application No. 17154204.6.

*Primary Examiner* — James C Yager
(74) *Attorney, Agent, or Firm* — Bachman & LaPointe, P.C.

(57) ABSTRACT

An additively manufactured component with an internal passage; and a multiple of ultrasonic horns additively manufactured within the internal passage. A method of removing conglomerated powder from an internal passage of an additively manufacturing a component, including ultrasonically exciting at least one of a multiple of the ultrasonic horns within an internal passage of an additively manufactured component

7 Claims, 5 Drawing Sheets

(51) Int. Cl.
   *B33Y 10/00* (2015.01)
   *B33Y 30/00* (2015.01)

(56) References Cited

U.S. PATENT DOCUMENTS

| | | |
|---|---|---|
| 7,777,155 B2 | 8/2010 | Twelves, Jr. |
| 8,383,985 B2 | 2/2013 | Twelves, Jr. |
| 8,488,994 B2 | 7/2013 | Hanson et al. |
| 8,506,836 B2 | 8/2013 | Szuromi et al. |
| 8,718,522 B2 | 5/2014 | Chillscyzn et al. |
| 8,879,957 B2 | 11/2014 | Hanson et al. |
| 8,961,167 B2 | 2/2015 | Swanson et al. |
| 8,985,497 B2 | 3/2015 | Mannella et al. |
| 8,994,592 B2 | 3/2015 | Scott et al. |
| 9,023,566 B2 | 5/2015 | Martin |
| 9,023,765 B1 | 5/2015 | Rimmer et al. |
| 9,029,058 B2 | 5/2015 | Martin |
| 9,039,917 B2 | 5/2015 | Szuromi et al. |
| 9,050,753 B2 | 6/2015 | Rodgers et al. |
| 9,050,788 B2 | 6/2015 | Swanson et al. |
| 9,073,263 B2 | 7/2015 | Mannella et al. |
| 9,079,803 B2 | 7/2015 | Xu |
| 9,114,478 B2 | 8/2015 | Scott et al. |
| 9,120,270 B2 | 9/2015 | Chen et al. |
| 2005/0136520 A1* | 6/2005 | Kinley .................. C12M 21/12 435/155 |
| 2010/0327072 A1 | 12/2010 | Tsai |

FOREIGN PATENT DOCUMENTS

| | | |
|---|---|---|
| GB | 2517490 A | 2/2015 |
| WO | WO 2016009602 A1 | 1/2016 |

* cited by examiner

ADDITIVE MANUFACTURED
CONGLOMERATED POWDER REMOVAL
FROM INTERNAL PASSAGES WITH
CO-BUILT ULTRASONIC HORNS

BACKGROUND

The present disclosure relates to additive manufacturing and, more particularly, to removing conglomerated powder from within an internal passage.

Precision engineered parts such as gas turbine components may be manufactured by an additive manufacturing operation such that features associated with conventional manufacturing processes, e.g., machining, forging, welding, casting, etc. can be eliminated to facilitate savings in cost, material, and time. Additive manufacturing often results in conglomerated powder building-up around, and within, the completed component as an artifact of the process. When additive manufacturing a component that has internal passages, this conglomerated powder often becomes entrapped in the internal passages and is difficult to remove.

There are currently few methods that directly and rapidly remove the conglomerated powder. One standard practice may include repeated use of an accelerated media blast, combined with mechanically scraping. Oftentimes, such practices are still inefficient at removal of removing conglomerated powder from within the internal passages.

SUMMARY

A component according to one disclosed non-limiting embodiment of the present disclosure can include an additively manufactured component with an internal passage; and a multiple of ultrasonic horns additively manufactured within the internal passage.

A further embodiment of the present disclosure may include, wherein the additively manufactured component include a first flange, a second flange, and a conduit with the internal passage there between.

A further embodiment of the present disclosure may include, wherein the conduit includes multiple bends.

A further embodiment of the present disclosure may include, wherein the internal passage is non line of sight.

A further embodiment of the present disclosure may include, wherein each of the multiple of ultrasonic horns includes an input section and an output section, the output section smaller than the input section.

A further embodiment of the present disclosure may include, wherein each of the multiple of ultrasonic horns includes an input section and an output section, the output section smaller extends at least partially within the input section.

A further embodiment of the present disclosure may include, wherein each of the multiple of ultrasonic horns includes an input section and an output section, a frustroconcial section between the output section the input section.

A further embodiment of the present disclosure may include, wherein each of the multiple of ultrasonic horns are designed to a particular known natural frequency.

A further embodiment of the present disclosure may include, wherein the particular known natural frequency is different than the natural frequencies of the component.

A method of additively manufacturing a component according to one disclosed non-limiting embodiment of the present disclosure can include additively manufacturing a component with an internal passage; and additively manufacturing a multiple of ultrasonic horns within the internal passage concurrent with additively manufacturing the component.

A further embodiment of the present disclosure may include, additively manufacturing each of the multiple of ultrasonic horns to a particular known natural frequency.

A further embodiment of the present disclosure may include, additively manufacturing each of the multiple of ultrasonic horns to a particular known natural frequency, wherein the particular known natural frequency is different than the natural frequencies of the component.

A method of removing conglomerated powder from an internal passage of an additively manufacturing a component, according to one disclosed non-limiting embodiment of the present disclosure can include ultrasonically exciting at least one of a multiple of ultrasonic horns within an internal passage of an additively manufactured component.

A further embodiment of the present disclosure may include, ultrasonically exciting each of a multiple of ultrasonic horns.

A further embodiment of the present disclosure may include, ultrasonically exciting each of a multiple of ultrasonic horns in series.

A further embodiment of the present disclosure may include, arranging each of the multiple of ultrasonic horns in sequence to at least partially overlap.

A further embodiment of the present disclosure may include, arranging each of the multiple of ultrasonic horns such that each of the multiple of ultrasonic horns at least partially overlaps a subsequent one of the multiple of ultrasonic horns.

A further embodiment of the present disclosure may include, arranging each of the multiple of ultrasonic horns within the internal passage.

A further embodiment of the present disclosure may include, selectively removing each of the multiple of ultrasonic horns within the internal passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
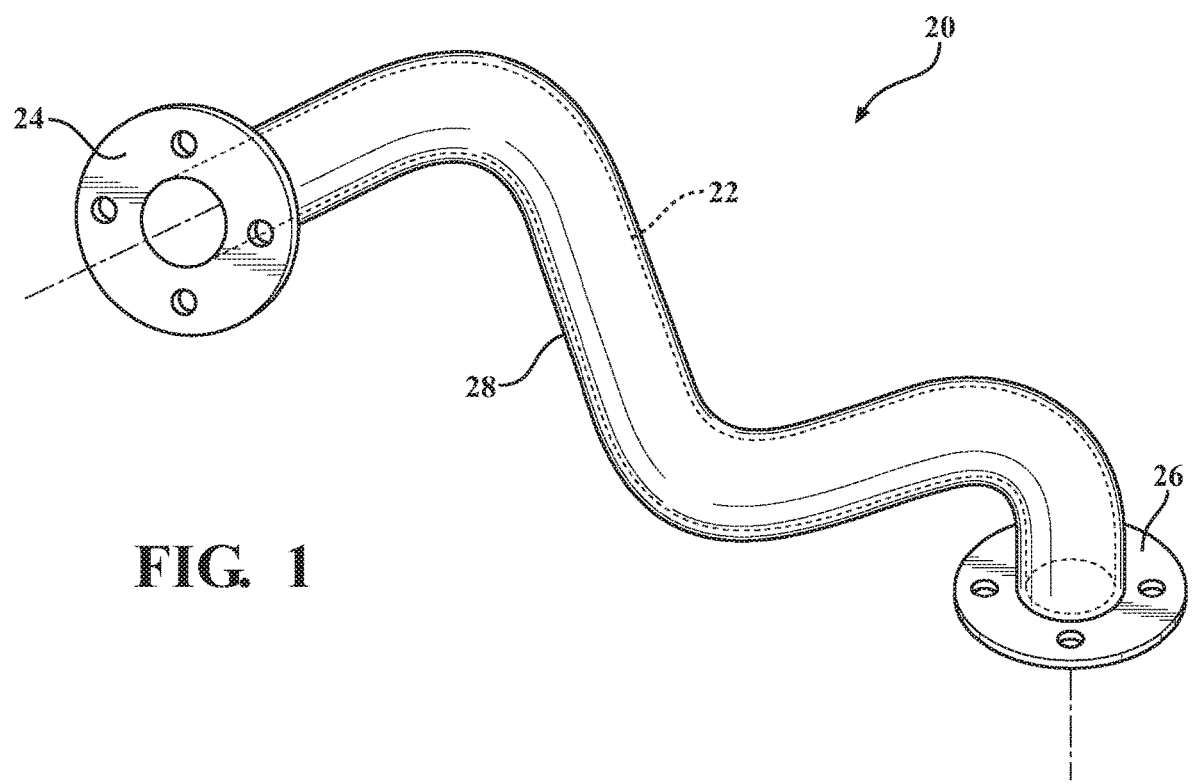
FIG. 1 is a perspective view of a representative additively manufactured component.

FIG. 1 schematically illustrates a component 20 that includes an internal passage 22. In this example, the component 20 may be a conduit such as that of a manifold, duct, flow passage, or other such component. The component 20 may include a first flange 24, a second flange 26, and a conduit 28 with the internal passage 22 there between. The internal passage 22 may be complex and be of a non-line of sight geometry that includes multiple bends. It should be appreciated that various additional or alternative segments and/or fittings may also be provided. It should be further appreciated that although a conduit type example is illustrated herein, other aerospace components, aircraft structures, as well as a wide variety of applications outside the aerospace industry, which include one or more internal passages, will benefit herefrom.

The component 20 may be readily manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component 20 is then "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

Figure 2:
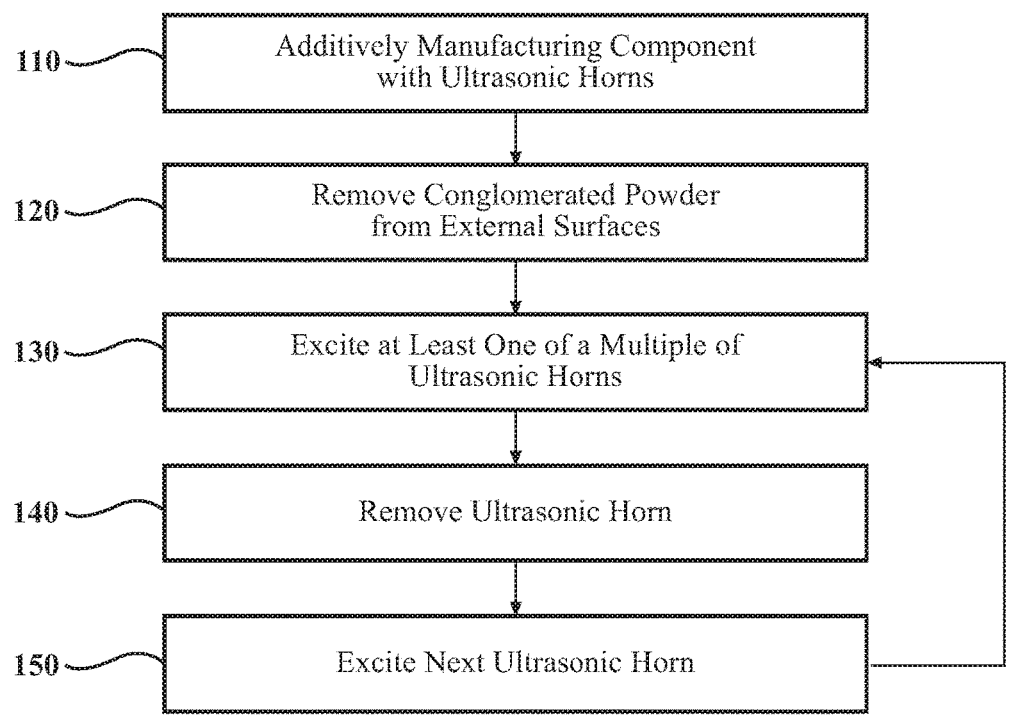
FIG. 2 is a method of additively manufacturing a component according to one disclosed non-limiting embodiment.
Figure 3:
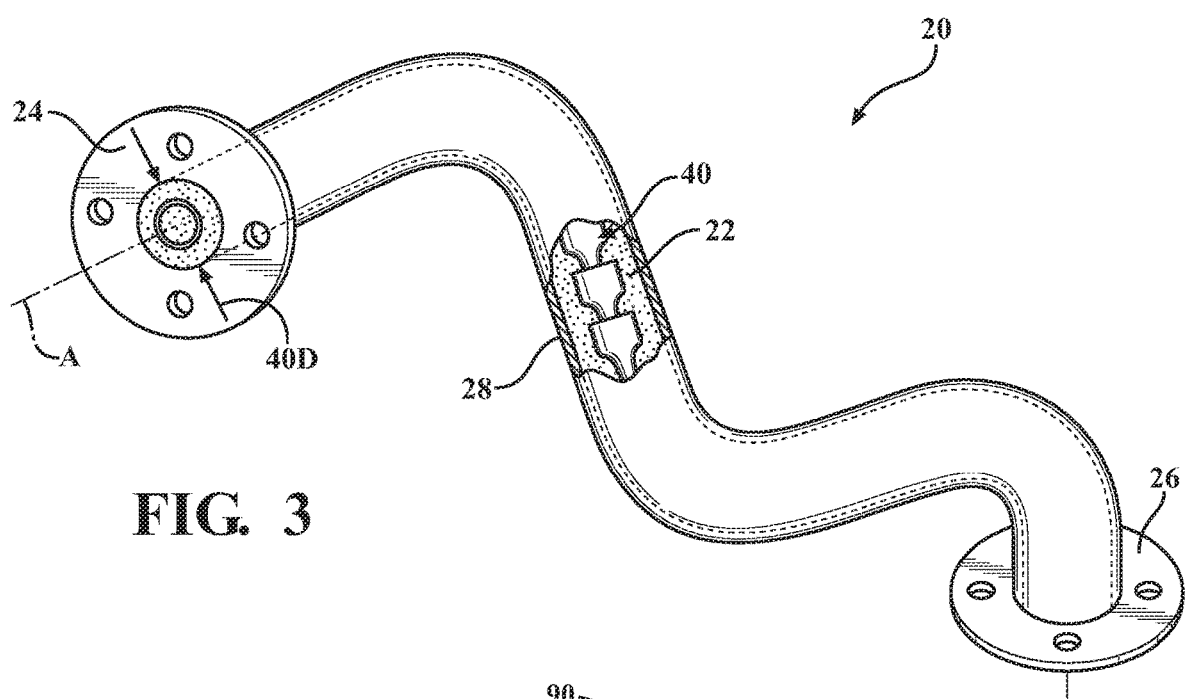
FIG. 3 is a perspective view of the additively manufactured component of FIG. 1 with a multiple of ultrasonic horns for removing conglomerated powder from within an internal passage.

With reference to FIG. 2, one disclosed non-limiting embodiment of a method 100 to additively manufacture the component 20 initially includes additively manufacturing the component 20 with a multiple of ultrasonic horns 40 co-built within the internal passage 22 (step 110; FIG. 3). That is, the multiple of ultrasonic horns 40 form no part of the component 20 but are additively manufactured simultaneously with the component 20.

Figure 4:
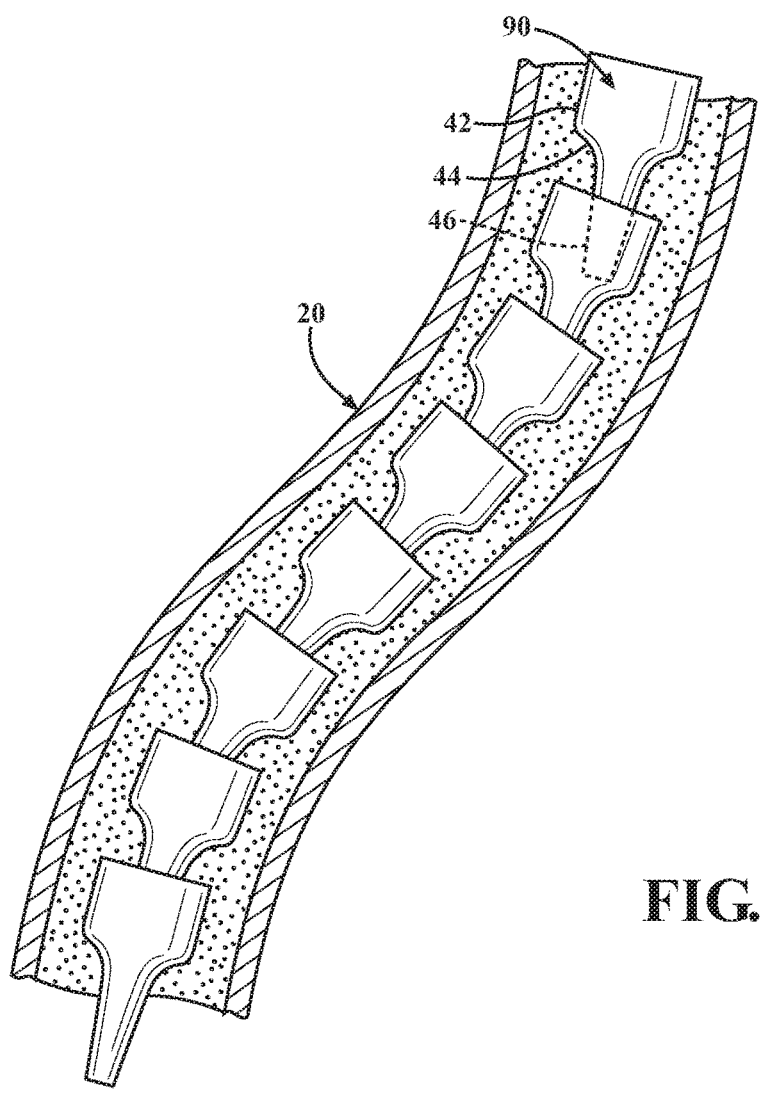
FIG. 4 is a perspective view of the additively manufactured component of FIG. 1 with a multiple of solid ultrasonic horns.

Each of the multiple of ultrasonic horns 40 includes an input section 42, a generally frustroconcial section 44, and an output section 46 (FIG. 4). The input section 42 of one ultrasonic horn 40 may extend at least partially into the output section 46 of a subsequent ultrasonic horn 40 to form a chain of ultrasonic horns 40 within the internal passage 22. The geometry of the ultrasonic horns 40 can also be designed to particular known natural frequencies, with considerations to avoid the natural frequencies of the actual additively manufactured component 20. The spacing and size of the ultrasonic horns 40 is also scalable for the internal passage 22.

Figure 5:
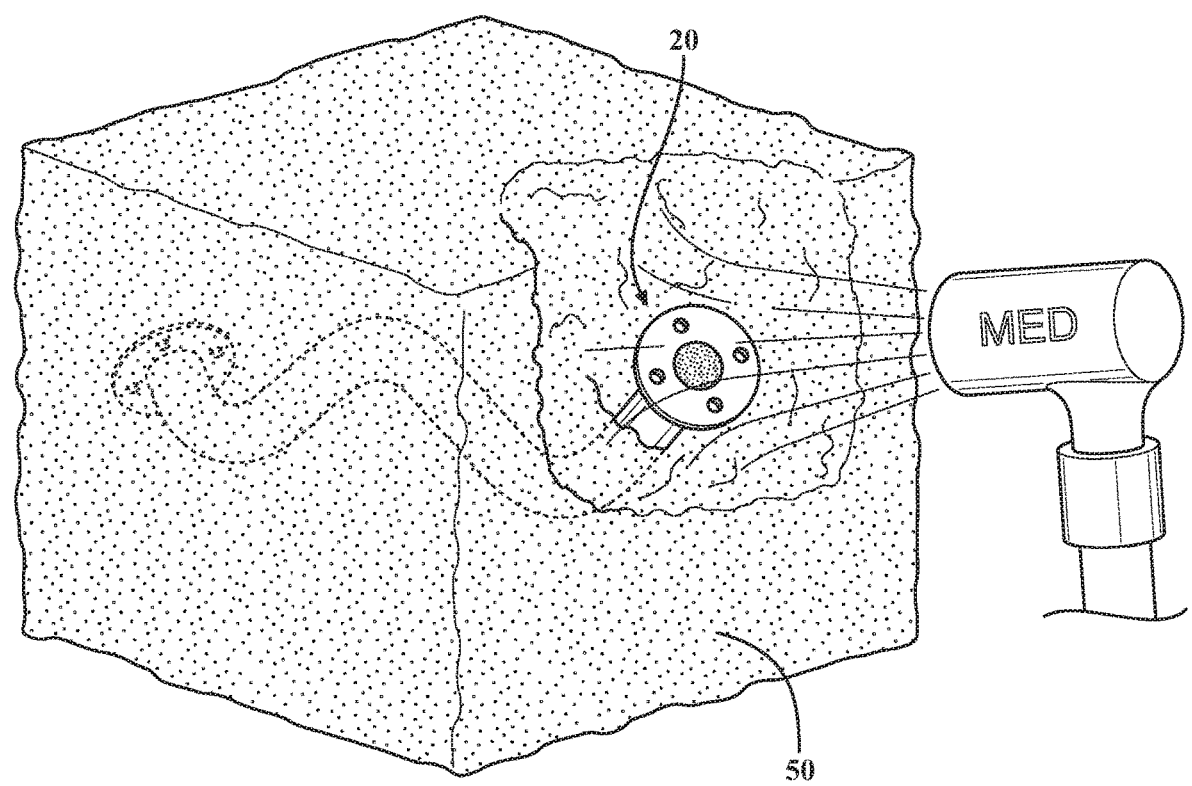
FIG. 5 is a perspective view of the additively manufactured component of FIG. 1 with a multiple of open ultrasonic horns.

Next, conglomerated powder 50 is removed from the external surfaces of the completed additively manufactured component 20 (step 120; FIG. 5). Removal is conventional and may include the use of accelerated media blast, mechanically scraping, vibratory or other methods. The completed component 20 thereby retains the multiple of ultrasonic horns 40 within the internal passage 22 once the conglomerated powder 50 is removed from the external surfaces. Alternatively, the conglomerated powder 50 may be removed from the external surfaces of the completed additively manufactured component 20 as a final operation.

Figure 6:
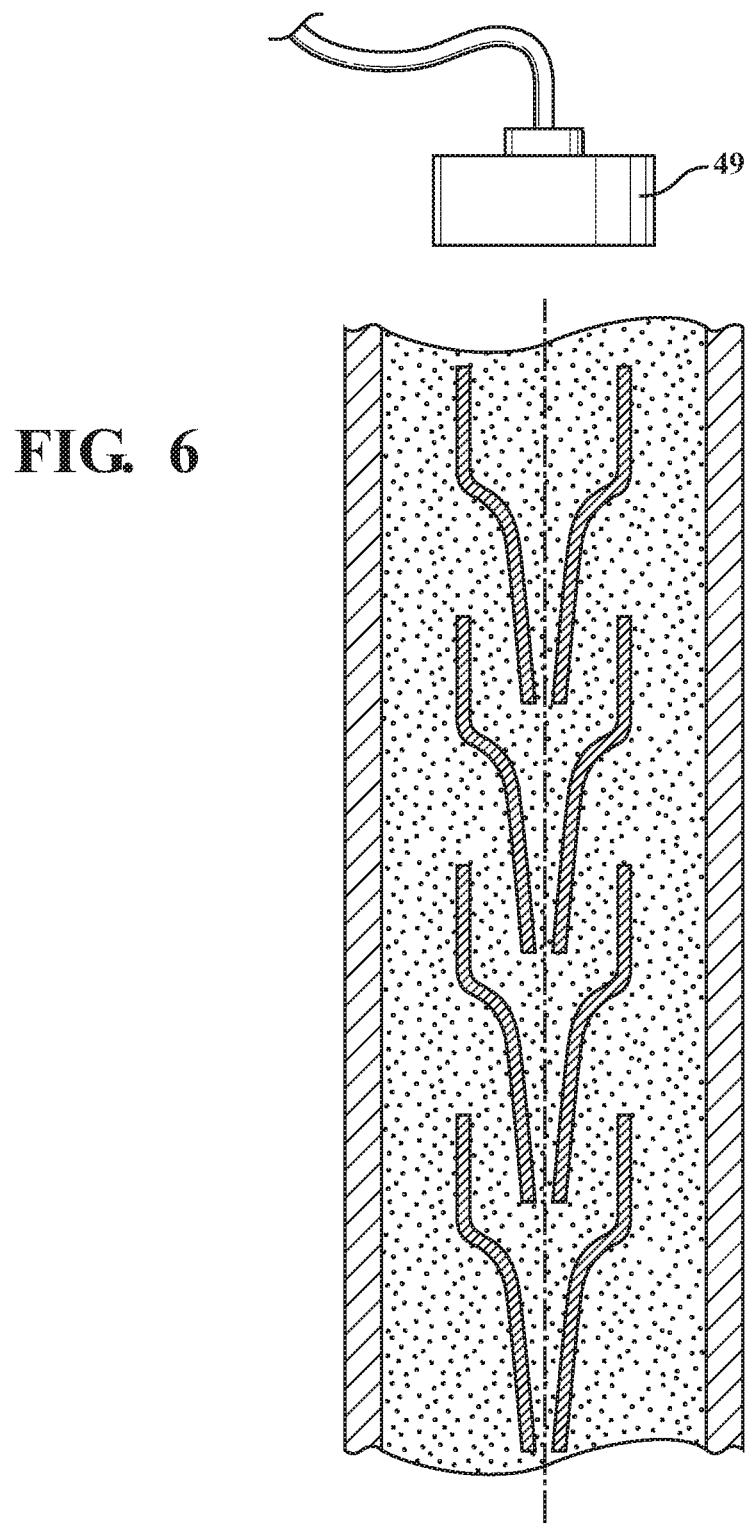
FIG. 6 is a perspective view of the additively manufactured component with the conglomerated powder.
Figure 7:
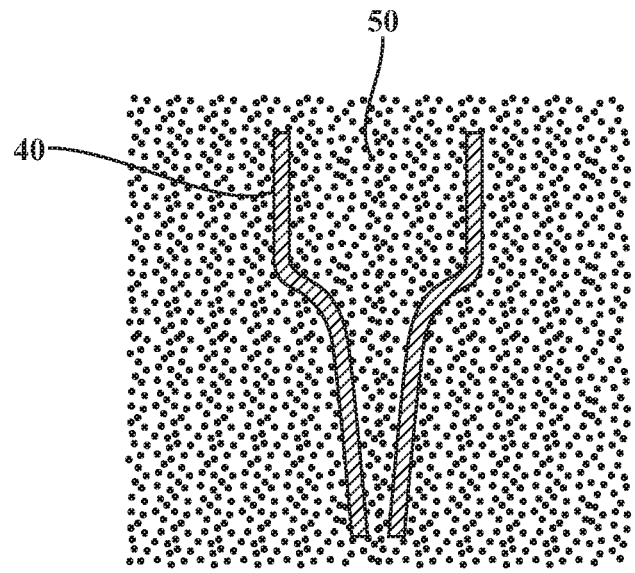
FIG. 7 is a perspective view of the multiple of ultrasonic horns within the semi-sintered powder.
Figure 8:
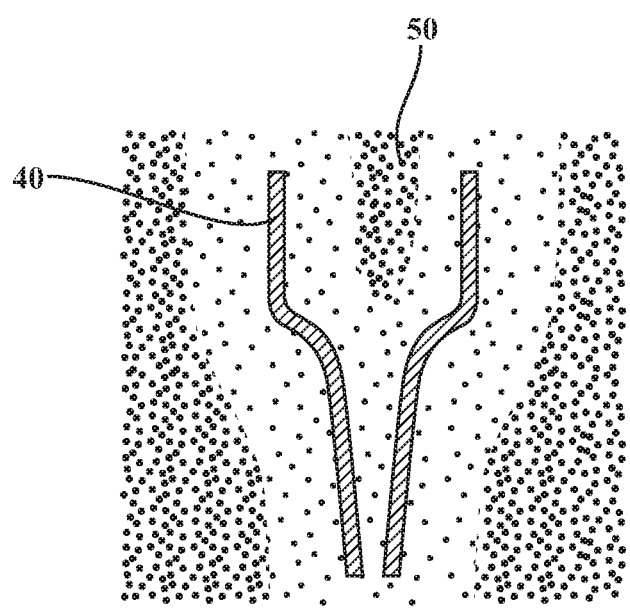
FIG. 8 is a perspective view of the multiple of ultrasonic horns that have loosened the semi-sintered powder.

Each of the multiple of ultrasonic horns 40 have parameterized geometries which, when excited by an ultrasonic transducer 49 (Step 130; FIG. 6) will increase the amplitude of acoustic vibration. The increased amplitude will impact the surrounding conglomerated powder 50 (FIG. 7), shaking, and breaking the bonds which are connecting the particles of the conglomerated powder 50 (FIG. 8). Once one ultrasonic horn 40 shakes free, the ultrasonic horns 40 may be removed from the internal passage 22 (Step 140), and the ultrasonic transducer 49 may be utilized to excite the next ultrasonic horn 40 (Step 150; FIG. 1). That is, each of the multiple of ultrasonic horns 40 are readily removed from the internal passage 22 once the conglomerated powder 50 is loosened thereby.

When the conglomerated powder 50 begins to loosen surrounding the ultrasonic horns 40, the flowability of the conglomerated powder 50 within the internal passage 22 will increase, and will begin to drain, or flow from the internal passage 22.

The multiple of ultrasonic horns 40 mechanically work the conglomerated powder 50 out of the internal passage 22. That is, the conglomerated powder 50 may be relatively compacted and the multiple of ultrasonic horns 40 operate to clean the internal passage 22 thereof. The multiple of ultrasonic horns 40 facilitate the removal of a relatively large volume of conglomerated powder 50.

Utilization of the multiple of ultrasonic horns 40 readily facilitates direct and rapid removal of the conglomerated powder from within internal passages.

The multiple of ultrasonic horns 40 provide mechanical mechanisms that increase the vibratory effect of the ultrasonic transducer 49 such that there is minimal manual operation in the process, and could be readily automated.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A component, comprising:
an additively manufactured component with an internal passage; and
a multiple of ultrasonic horns additively manufactured within the internal passage to clean the internal passage of conglomerated powder subsequent to additive manufacturing of the component.

2. The component as recited in claim 1, wherein the additively manufactured component include a first flange, a second flange, and a conduit with the internal passage there between.

3. The component as recited in claim 2, wherein the conduit includes multiple bends.

4. The component as recited in claim 2, wherein the internal passage is non line of sight.

5. The component as recited in claim 1, wherein each of the multiple of ultrasonic horns includes an input section and an output section, the output section smaller than the input section.

6. The component as recited in claim 1, wherein each of the multiple of ultrasonic horns includes an input section and an output section, a frustroconcial section between the output section the input section.

7. The component as recited in claim 1, wherein each of the multiple of ultrasonic horns have parameterized geometries which, when excited by an ultrasonic transducer will increase the amplitude of acoustic vibration to clean the internal passage of conglomerated powder subsequent to completion of the additively manufacturing of the additively manufactured component.

* * * * *